United States Patent [19]

Ogawa et al.

[11] Patent Number: 4,660,228

[45] Date of Patent: Apr. 28, 1987

[54] GLOVE

[75] Inventors: Yasuhiro Ogawa, Suita; Yasuo Muramoto, Osaka, both of Japan

[73] Assignees: Kanebo, Ltd., Tokyo; Kanebo Synthetic Fibers, Ltd., Osaka, both of Japan

[21] Appl. No.: 752,224

[22] Filed: Jul. 3, 1985

[30] Foreign Application Priority Data

Jun. 8, 1985 [JP] Japan .............................. 60-86814[U]
Jun. 10, 1985 [JP] Japan .............................. 60-87777[U]
Jun. 12, 1985 [JP] Japan ................................. 60-127824

[51] Int. Cl.$^4$ ............................................ A41D 19/00
[52] U.S. Cl. ............................................ 2/167; 2/168
[58] Field of Search ...................... 2/168, 167, DIG. 7; 57/901; 264/DIG. 75, 555

[56] References Cited

U.S. PATENT DOCUMENTS

| 3,094,704 | 6/1963 | Abildgaard | 2/167 |
|---|---|---|---|
| 3,235,881 | 2/1966 | Chisholm | 2/167 |
| 3,379,811 | 4/1968 | Hartmann et al. | 264/555 |
| 3,681,784 | 8/1972 | Lindley | 2/167 X |
| 3,878,174 | 4/1975 | Jenkins et al. | 57/901 X |
| 3,879,764 | 4/1975 | Weber-Liel | 2/167 |
| 4,064,075 | 12/1977 | Hull | 57/901 X |
| 4,084,265 | 4/1978 | Anfelt | 2/167 X |
| 4,238,175 | 12/1980 | Fujii et al. | 264/DIG. 75 |
| 4,430,759 | 2/1984 | Jackrel | 2/167 X |
| 4,539,255 | 9/1985 | Sato et al. | 2/168 X |

Primary Examiner—Louis K. Rimrodt
Attorney, Agent, or Firm—Flynn, Thiel, Boutell & Tanis

[57] ABSTRACT

A glove comprising two elastic sheet materials, at least one of which consists essentially of a selected elastic polyurethane nonwoven fabric, in particular, relatively thin, is elastic, air and moisture permeable, dimensionally and texturally stable, nonslip and dustproof. It comfortably fits on the hand, substantially allowing fingers to move freely and retaining an exquisite sense of touch, and is particularly useful as a work or sport glove for slip-prevention and/or dustproofing purposes.

14 Claims, 3 Drawing Figures

GLOVE

BACKGROUND OF THE INVENTION

1. Field of the Invention

This invention relates to gloves and more particularly relates to work or sport gloves comprising elastic polyurethane sheet materials.

2. Description of the Prior Art

As work or sport gloves, a cloth glove having its palm coated with rubber latex, i.e., the so-called rubbered glove has so far been known. Such rubbered gloves in general are rather thick and exhibit poor air permeability, so that they are not comfortable to wear. Moreover, the rubbered gloves are not adaptable for use in precise and minute work or sport activities that require an exquisite and delicate feeling or sense of finger touch which is appreciably reduced by the gloves.

Further, waterproof gloves composed of synthetic resin sheet materials, such as film, by means of heat-sealing are also well-known. Since the materials have little elongation, those gloves are usually formed in a size considerably larger than the hand, so that they do not fit on well when wearing, which demerit along with the slippery surface thereof causes difficulties similar to those of the above-mentioned rubbered gloves.

As an improvement of the above, gloves consisting of a thin elastic film of synthetic resin or rubber are well-known as well. Those fit well on the hand, while, however, the wearing properties are deteriorated either by intense tightening of the hand due to a comparatively high modulus of the elastic film or by accumulation of sweat inside due to the lack of air permeability.

Fibrous sheet materials such as woven fabrics, knitted goods, nonwoven fabrics and the like are most suitable for providing adequate air permeability, whereas in fact sheet materials as thin as to substantially retain an exquisite sensibility of touch are poor in dimensional and textural stabilities, wherefore the texture will be disarranged even by slight friction, so that they are not suitable for work or sport gloves.

In order to provide such sheet materials with improved dimensional and textural stabilities, many attempts have heretofore been made to develop processes for bonding constituent fibers together at cross-contact points thereof in the sheet material by means of a resin finish, etc. which, however, causes stiffening and significant reductions in elasticity which greatly affect the wearing properties as well as the sense of touch of the hand.

We, the inventors, have recognized the fact that gloves particularly suitable for work and sports are obtainable, eliminating entirely the various disadvantages in the above-mentioned existing gloves, by applying elastic polyurethane nonwoven fabrics which were proposed by the present inventors in the Gazette of Japanese Patent Application Laid-open No. 59-223,347 and thus the present invention has eventually been accomplished.

SUMMARY OF THE INVENTION

The present invention has its principal object to provide gloves which fit comfortably on the hand without undesirable intensive tightening whereby substantially to allow the hand and fingers to move freely retaining an exquisite and sharp sense of touch.

Another object of the invention is to provide durable gloves comprising thin fibrous sheet materials, with appropriate elasticities, air and moisture permeabilities and dimensional and textural stabilities, whereby furnishing them with excellent wearing properties, preventing the inside from humidification.

The other object of the present invention is to provide a glove which allows the wearer's hand to keep the sense of touch substantially exquisite and sharp and therefore, are adaptable to work, particularly precise and minute operations and also employable in such sports that need delicate hand motion controls and reflexes.

A further object of this invention is to furnish dust-proof work gloves to be suitably employed in operations which require a clean environment strictly free from dust, such as in the manufacture of electronic devices, precision instruments, pharmaceuticals or foodstuffs, or in medical treatment.

An additional object is mass production of the above-mentioned gloves with a simplified process and low cost.

The other objects will be made clear by the following descriptions.

The above objects are attainable by a glove comprising two elastic polyurethane sheet materials, at least one of which consists essentially of an elastic polyurethane nonwoven fabric having an air permeability, the two sheet materials being heat sealed together along the periphery of a configuration corresponding to the contour of a hand, leaving the wrist portion unsealed.

In a most fundamental embodiment of the present invention, both of the two sheet materials constituting the glove may comprise a selected elastic polyurethane nonwoven fabric.

In a preferred embodiment of the invention, one of the sheet materials may comprise a selected elastic polyurethane nonwoven fabric and the other a laminate of an elastic polyurethane nonwoven fabric and an elastic polyurethane film.

In another embodiment, both of the said two sheet materials may comprise a laminate of an elastic polyurethane nonwoven fabric and an elastic polyurethane film.

Besides, it is preferred that at least one of the said sheet materials has a pattern embossed on the surface thereof.

Finally, it is particularly desirable that the said sheet materials are provided with an antistatic property.

BRIEF DESCRIPTION OF THE DRAWINGS

The present invention will be further illustrated with reference to the drawings attached herewith.

DETAILED DESCRIPTION OF THE INVENTION

Figure 1:
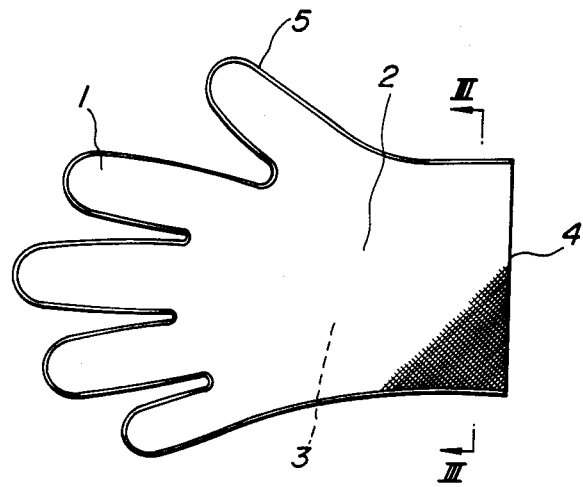
FIGS. 1 and 2 respectively show a plan view of an embodiment of a glove and mitten of the invention.

The glove of the present invention is composed of two elastic polyurethane sheet materials, at least one of which consists essentially of an elastic polyurethane nonwoven fabric. In FIG. 1, those two sheet materials are heat sealed together along the periphery 5 of the configuration including finger sections 1, palm section 2 and back section 3, corresponding to the contour of hand, leaving the wrist portion 4 unsealed.

Figure 2:
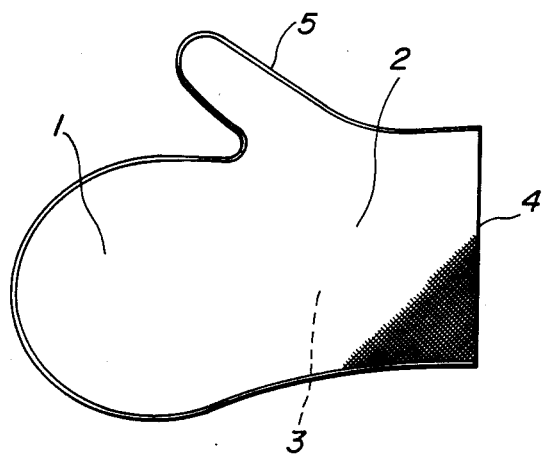
Figure 3:
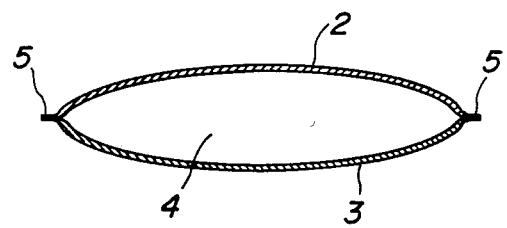
FIG. 3 is an enlarged cross-sectional view along the line III—III in FIG. 1.

As is shown in FIG. 2, the configuration of the structure may be of a mitten type having a separate section for the thumb only. It can be shaped in any contour suitable for its purpose and use, e.g. it may be of a type having additional separate sections for the forefinger or further for the middle finger as well.

An elastic polyurethane nonwoven fabric which can be most preferably employed in this invention has been proposed by the inventors of the present invention in the Gazette of Japanese Patent Application Laid-open No. 59-223,347.

Namely, it is an elastic polyurethane nonwoven fabric having excellent elasticity and softness together with improved air permeability, which is formed by a process comprising melt-spinning a polyurethane polymer from a multi-hole spinneret and substantially not assembling the formed filaments in a bundle, but randomly overlapping a plurality of spun filaments to form a sheet in which the filaments are bonded together by themselves substantially at all of the cross-contact points thereof. The thus formed nonwoven fabric exhibits a bending resistance (y) within the range represented by the following formula:

$$y < 0.2x + 30$$

where, y (mm) denotes the stiffness and x (g/m$^2$) the weight of the fabric. The single filament usually has an average diameter of 30 microns or less, preferably 25 microns or less and more preferably 20 microns or less. Though the diameter of the single filament may naturally vary over a certain range, it is desired not to exceed approximately 50 microns at the largest. The larger the diameter, the stiffer the nonwoven fabric becomes.

Important features of such nonwoven fabrics are extremely high values of breaking strength and elongation at break thereof as well as an excellent elasticity thereof. The nonwoven fabrics reflect all preferably characteristics of constituent elastic polyurethane filaments, which cannot be realized in conventional nonwoven fabrics consisting of inelastic fibers or in those of less elastic fibers such as consisting if polyester-ether elastomers and the like.

The above-mentioned nonwoven fabrics to be employed in the present invention exhibit generally an elongation at break of 300-800%, preferably at least 500%. The breaking strength is generally 0.4-1.2 kg/cm, preferably at least 1.0 kg/cm, though it varies depending upon the thickness of fabrics. Further, their elastic recovery percentage of 100% elongation is usually at least 85%, preferably at least 90%, and that of 50% elongation is at least 90%. The strength, elongation and elastic recovery percentage of elongation vary depending upon the bonding strength at cross-contact points of filaments constituting the nonwoven fabrics. The above-mentioned values of the strength, elongation and elastic recovery percentage of elongation displayed by the nonwoven fabrics prove the fact that the said bonding strength is sufficiently high.

Further, an outstanding feature of this nonwoven fabric is the fact that it exhibits excellent softness and elasticity, notwithstanding the constituent filaments are bonded together at substantially all the cross-contact points thereof and, that it has not only improved dimensional and textural stabilities but also a superior durability, nevertheless it is a thin and light weight fabric comprising extremely fine fibers.

Furthermore, nonwoven fabrics as such to be applied to the present invention have a weight of 50-150 g/m$^2$ and an air permeability of at least 10 cc/cm$^2$/sec.

Moreover, a great feature of such nonwoven fabrics is an extremely improved softness. The stiffness of nonwoven fabrics (measured pursuant to the 45 degrees cantilever method prescribed in JIS L-1096) will increase as the weight increases. The nonwoven fabrics to be employed in this invention will have a weight x (g/m$^2$) defined by the following formulae, $$y < 0.2x + 30$$

preferably, $$y < 0.2x + 20$$

where x (g/m$^2$) represents the weight of fabric.

The above-mentioned feature results from physical properties of polyurethane elastomers and the aforementioned structure as well as the small diameter of the constituent fibers of the nonwoven fabrics, which feature could not be realized in a web comprising conventional elastic polyurethane fibers wet spun or dry spun. Then, a preferred stiffness of the nonwoven fabrics is in the range of 20-50 mm.

In addition to the above, it is desirable particularly for a specified use as explained hereinafter that the said polyurethane non-woven fabrics have an antistatic property, such as exhibiting a triboelectric voltage of 3 KV or less at 20° C. and 40% R.H.

The nonwoven fabrics mentioned above are obtained by a so-called melt-blow process. Namely, immediately after melt-spinning a conventional thermoplastic polyurethane elastomer, high temperature gas jet streams are directed along the path of the spun filaments, the substantially continuous filaments attenuated by the jet streams are randomly lapped over in a sheet form and the overlapped filaments are bonded together by themselves at cross-contact points thereof. More particularly, using, for instance, a spinning apparatus such as described in the specification of U.S. Pat. No. 3,379,811, a melt of a thermoplastic polyurethane elastomer is spun from nozzles of a spinneret and the spun filaments are attenuated by e.g. heated gas streams discharged from slot discharge openings disposed on both sides of the nozzles. A plurality of attenuated filaments are, substantially without being assembled in a bundle, randomly lapped over on a collecting device such as a moving conveyor net where the filaments are separated from the gas streams. The overlapped filaments are in situ bonded together by themselves at cross-contact points thereof due to their own heat. The bonding may be also effected by additional heating and pressing with rolls, etc. after or before cooling and thereby solidifying the overlapped filaments on the collecting device. In order to secure the bonding of the inter-filament contact points, the distance between the spinneret and the collecting device should not be too long and at most 1 m, preferably 50 cm or less is recommended.

The aforementioned antistatic polyurethane nonwoven fabrics are obtainable, for instance, in such a manner that in the abovementioned melt-blow process, electroconductive filaments carried by the gas jet streams are mixed with the spun polyurethane filaments and the mixed filaments are lapped over on the collecting device. As the electroconductive filaments, any of known such filaments can be employed, such as metallic fibers, fibers plated or deposited with a metal by means of sputtering, vacuum evaporation, etc., and composite filaments comprising two thermoplastic polymer components adhered to each other extending along the filament axis, one component being electroconductive and the other being non-conductive. A preferable amount of electroconductive fibers to be incorporated in nonwoven polyurethane fabrics is 0.05–5% by weight.

Antistatic polyurethane nonwoven fabrics can also be obtained in different manners such that urethane polymers are blended with a known antistatic agent prior to spinning, or nonwoven fabrics are finished with antistatic agents in accordance with processes well-known per se.

Methods for determining the physical properties of the nonwoven fabrics are as follows:

Breaking strength and elongation at break was determined as follows:

Pursuant to JIS L-1096, a specimen of 2 cm wide set on a constant rate of extension type tester with autographic recorder, Tensilon UTM III-500 (manufactured by TOYO BALDWIN CO.) with the clamp distance of 5 cm is elongated at the extension rate of 10 cm/min. The strength (kgf) and elongation at break (%) per 1 cm width are determined in an average obtained to three significant figures from three or more measurements.

Elastic recovery percentage of 100(50)% elongation was determined as follows:

A specimen of 2 cm wide set on the above Tester with the clamp distance of 5 cm is elongated at the extension rate of 10 cm/min. until the specimen reaches 100(50)% of the stretch and immediately thereafter allowed to recover to its original position at the same rate and left still for three minutes. This sequence is repeated ten times, then the specimen is stretched again at the same rate as above to allow the tester to draw a load-stretch curve. The residual elongation percentage L(%) is read on the curve and the elastic recovery percentage of 100(50)% elongation is calculated by the following formula:

Elastic recovery percentage of 100(50)% elongation =

$$\frac{100(50) - L}{100(50)} \times 100$$

The stiffness was determined by the 45 degrees cantilever method in pursuance of JIS L-1096 as follows: Namely, five specimens, each measuring 2 cm × approximately 15 cm are taken out of a sample. The specimen was placed on a horizontal table with a 45° slope on its one side and smooth surface so as to align a short end of the specimen with the base line of a scale set lengthwise on the horizontal table. Then the position of the opposite end of the specimen is read on the scale. The specimen is slid slowly towards the slope by a suitable means, and the position (mm) of the opposite end is read on the scale when the central point of the end reaches the same place as the slope. The stiffness, by which is meant to what degree the specimen is stiff, is indicated by the moving distance of the specimen. The stiffness is measured both for the front surface and for the back of each specimen, and expressed in an average obtained from the measurements made for the front surface and back of five specimens.

The air permeability is determined using a Frazir type air permeability tester as is described in JIS L-1096 as follows: A specimen is attached to an end of the cylinder of the tester and a suction fan is adjusted by a rheostat so that an inclined barometer shows the pressure of 1.27 cm (124.5 Pa) on a water column. The air volume (cc/cm$^2$/sec.) having passed through the specimen is obtained from the pressure at this time indicated by a vertical barometer and the type of air hole used by the aid of a table attached to this tester. The air volume abovementioned is measured 5 times, and expressed in an average obtained from 5 measurements.

As elastic polyurethane film applicable to the present invention can be readily obtained by a melt-extrusion process (with a T-die) as well as a dry or wet process. In order to provide sheet materials containing the film with improved elasticity and softness as well as a strength for practical use, the film is preferred to be relatively thin, having a thickness of 5 to 30 microns, so that the film produced dry or wet is more preferable.

In the dry process, the film is produced by application of a solvent solution of polyurethane elastomer onto a release paper utilizing a doctor blade, followed by drying. When a polyurethane elastomer having a 100% modulus of 40–100 kg/cm$^2$ and a tensile strength of at least 450 kg/cm$^2$ is used to form the film, the sheet material incorporated with such film may be provided with improved elasticity and softness as well.

Polyurethane elastomers as such are commercially available in any required amount.

In the wet process, the film is obtainable by application of a polyurethane elastomer solution, like the aforementioned dry process, onto a nylon or polyester taffeta having its releasability improved by means of a silicone finish, etc., followed by soaking in water to coagulate the polyurethane into a film form (the so-called wet regeneration).

The wet process film effectively provides moisture permeabilities to sheet materials to be applied to the invention whereas the film is low in mechanical strength due to its fine porosity.

Polyurethane elastomers to be used for the manufacture of films in wet processes are also commercially available and as for the 100% modulus and tensile strength of the elastomer, the same as the dry process is desirable.

Preferable physical properties of such elastic polyurethane films are, for instance, as follows:

| Breaking strength | 1.0–20.0 kg/cm |
|---|---|
| Elongation at break | 300–900% |
| Elastic recovery percentage of 50% elongation | 90% or more. |
| Moisture permeability | 1,500 g/m$^2$ · 24 hr. or more. |

In particular, the moisture permeability is preferred to be at least 2,000 g/m$^2$·24 hr. The determination of the moisture permeability is performed under conditions of a temperature of 40° C., relative humidity of 90% and humidification time of 4 hours, pursuant to JIS Z-0208.

As exhibiting an adequate moisture permeability, the aforementioned wet process films are preferably applied to the present invention, while, on the other hand, also useful are polyurethane dry process films provided with a moisture permeability by a process such as disclosed in European Patent Application No. 104,049 (corresponding to U.S. patent application Ser. No. 532,954 filed on Sept. 16, 1985, now U.S. Pat. No. 4,539,253, granted Sept. 3, 1985) filed by the assignee of the present application.

Namely, a dry process film having moisture permeability is formed of a polyurethane modified by an addition polymerization with an α-amino acid-N-carboxy anhydride such as γ-methyl-N-carboxy-L-glutamate anhydride. The modified polyurethane preferably having a 2-20% modification rate is formed into a film of 5-20 microns thick.

Same as the polyurethane nonwoven fabrics, the elastic polyurethane film, particularly for a specified use, is desired to have an antistatic property. Such antistatic films can be prepared by incorporating a suitable known antistatic agent into the polyurethane before or after the film formation.

As has been already mentioned above, in the case where both of two elastic polyurethane sheet materials comprise a nonwoven fabric in this invention, at least one of them may be laminated with the abovementioned elastic polyurethane film. In this case, as adhesives for conjoining the polyurethane nonwoven fabric with the polyurethane film, an adhesive agent used for dry process artificial leathers, in particular, a thermosetting polyurethane elastomer of the two liquid-type is preferably employed. Many kinds of such adhesives are also commercially available, among which those having a relatively low 100% modulus usually of 20 to 50 kg/cm$^2$ are recommendable so as not to deteriorate the stretchability and softness of the resultant sheet materials.

As both of the nonwoven fabrics and the films to be bonded together are of a polyurethane elastomer, their conjoining by means of adhesives is very easily effected. The adhesives applied in an amount of 5-40 g/m$^2$, preferably 10-25 g/m$^2$ will provide sheet materials with a sufficiently high bonding strength and an improved softness.

In this invention, the elastic polyurethane sheet materials may be used as they are in the formation of the gloves, while at least one of the sheet materials is preferred to be subjected to an embossed finish to produce a raised pattern on the surface thereof. The embossed pattern thus formed will promote not only the effect of slip-prevention but also the abrasion resistance and dustproofing.

The embossing can be effected e.g. by passing the sheet materials through a nip of an embossing roll and a resilient roll such as a so-called pulp roll, cotton roll or the like, heated to 100°-150° C.

As the embossed pattern formed on the surface of sheet materials, mention may be made of e.g. a dotted, water-drop, dashed, latticed, striped, checkered, arabesque, waved, aventurine, grained, and the like patterns. Dotted patterns are particularly preferable, while patterns comprising fine lines are not preferred due to a tendency to reduce a tearing strength.

In the case where an elastic polyurethane nonwoven fabric is used as the sheet materials, a concavo-convex rate of the surface, i.e. an areal proportion of recessed parts to raised parts is preferably 1/9-9/1 and more preferably in the range of 3/7-7/3. When the said concavo-convex rate is within the above range, the interfilament bonding will be further promoted and secured at the recessed parts where the nonwoven fabric is compressed, whereby the density will also increase resulting in appreciable improvements in abrasion resistance and dustproofness, while, on the other hand, since the raised parts have a comparatively lower density and higher air permeability than the recessed parts are distributed to an appropriate degree, the air permeability of the sheet materials sufficient for practical use may be assured. However, if the concavo-convex ratio is outside the above range, the desirable effect of embossing will not be obtained and the air permeability or wearing property will not be improved.

A preferred process for manufacturing the glove of the present invention is that the above-mentioned two sheet materials lapped over each other are subjected to melt-cutting simultaneously with heat sealing by means of a high-frequency welder, etc. equipped with a die having a die-cut shape corresponding to the contour of a hand.

In this case, in order to facilitate the insertion of the hand into the glove and besides, to provide an adequate fit, one of the elastic sheet materials may be stretched by 70% or less, preferably 10-50%, in the lateral direction, i.e. perpendicularly to the middle finger, and thereafter laid over the other sheet material, for welding. If the stretch ratio exceeds 70%, the insertion of the hand will become much easier whereas in fact a comfortable fit when wearing will not be obtained and moreover defects in heat sealing such as seam breakages will result during melt-cutting.

Since the gloves of the present invention are manufactured by bonding two elastic polyurethane sheet materials together by means of heat sealing without using sewing threads, they exhibit significantly high elasticity and softness whereby they fit comfortably on the hand with little feeling of difference.

Further, as they are formed of high elastic polyurethane sheet materials having a relatively low modulus and a high elastic recovery percentage of elongation, the gloves of this invention will not only fit comfortably without undesirable intensive tightening but also not restrain the free movement of the hand. Besides, their adequate air and moisture permeabilities will serve to prevent the inside from humidification and accumulation of sweat, which results in excellent wearing properties.

Furthermore, the gloves of the invention comprising sheet materials as thin as to substantially retain an exquisite sensibility of touch will be most suitable for precise and minute work dependent on the sense of touch and also for sports for which delicate hand motion controls and reflexes are important. In addition, although thin and air permeable, none the less they have such particular advantages as high dimensional and textural stabilities and an improved durability due to the bonding of constituent filaments together at substantially all of cross-constant points thereof.

Other than the above, the gloves of the invention possess such an advantage that a thing laid hold of by the glove hardly slips due to a high surface friction.

More than all, the glove according to the invention which comprises antistatic sheet materials composed of antistatic polyurethane nonwoven fabrics and/or films as hereinbefore described is particularly useful as a dustless glove. Requirements for the dustless gloves to be employed, for example, in a clean room where micro-electronic devices are manufactured, are said in general, to be firstly without frictional electrification so as not to attract dust, secondly dustproof to prevent dust from passing through the glove and thirdly less prone to generation of dust from constituent materials per se.

The abovementioned glove of the invention comprising antistatic sheet materials fulfills the above first requirement.

Moreover, the elastic polyurethane nonwoven fabrics to be applied to the invention comprise substantially continuous filaments, which scarcely produce any dust from themselves. Therefore, in particular, the glove having its palm portion formed with a sheet material comprising either the polyurethane film or the embossed elastic polyurethane nonwoven fabric, does not allow dust and/or dirt of the hand to transfer to the thing laid hold on, so that it displays a sufficient dustproofness.

On account of outstanding advantages such as mentioned above, the gloves of the present invention are useful, in particular, for the purpose of slip-prevention in surgical operations, operations such as handling glass bottles, chemical experiments, car driving, various sports such as golf, tennis, baseball and the like, general household work, etc. and also preferably employable in operations which require a dustless environment, e.g. for manufacturing electronic devices such as semi-conductor devices and the like, precision machines and instruments such as watches and the like, pharmaceuticals and foodstuffs, and for medical treatments.

Since mass production can be realized advantageously by means of high-frequency welders which reduces the production cost, the gloves of the invention can be supplied to consumers at a relatively low price.

While there has been shown and described the preferred embodiments of the present invention, it will be obvious to those skilled in the art that various alterations and modifications thereof can be made without departing from the scope of the invention as defined by the following claims.

What is claimed is:

1. A glove comprised of two elastic polyurethane sheets, at least one of which consists essentially of an elastic polyurethane fiber, nonwoven, air-permeable fabric, said two sheets being heat sealed together along the periphery thereof to form a configuration corresponding to the contour of a hand, leaving the wrist portion unsealed.

2. A glove as claimed in claim 1 wherein both of said sheets comprise an elastic polyurethane nonwoven fabric.

3. A glove as claimed in claim 1 wherein at least one of said two sheets comprises a laminate of an elastic polyurethane nonwoven fabric and an elastic polyurethane film.

4. A glove as claimed in claim 1 wherein one of said sheets comprises an elastic polyurethane nonwoven fabric and the other an elastic polyurethane film.

5. A glove as claimed in claim 1, claim 2, claim 3 or claim 4 wherein said elastic polyurethane nonwoven fabric has a weight of 50–150 g/m$^2$ and an air permeability of at least 10 cc/cm$^2$/sec. and comprises filaments each having an average diameter of approximately 50 microns or less, said filaments being disposed in random, overlapping relationship and being substantially heat bonded together at the cross-contact points thereof in said nonwoven fabric.

6. A glove as claimed in claim 5 wherein said nonwoven fabric exhibits an elongation at break of 300–800%, a breaking strength of 0.4–1.2 kg/cm, an elastic recovery percentage of 100% elongation of at least 85%, an elastic recovery percentage of 50% elongation of at least 90% and a bending resistance of 20–50 mm.

7. A glove as claimed in claim 5 wherein said average diameter of a single filament of said nonwoven fabric is 30 microns or less.

8. A glove as claimed in claim 3 or 4 wherein said film has a moisture permeability of at least 1,500 g/m$^2$·24 hr.

9. A glove as claimed in claim 8 wherein said moisture permeability is at least 2,000 g/m$^2$·24 hr.

10. The glove claimed in claim 8 wherein the said film exhibits a breaking strength of 1.0–20.0 kg/cm, an elongation at break of 300–900% and an elastic recovery percentage of 50% elongation of at least 90%.

11. A glove as claimed in claim 1 wherein at least one of said sheets has an embossed pattern on the surface thereof to promote the abrasion resistance, dustproofness and grip of said glove.

12. A glove as claimed in claim 11 wherein at least one of said sheets has an antistatic property.

13. A glove as claimed in claim 1 wherein said fabric contains from about 0.05 to about 5 wt.% of electrically conductive fibers.

14. A glove comprised of two elastic polyurethane sheets, at least one of said sheets consisting essentially of an air-permeable, nonwoven fabric made of elastic polyurethane filaments and having a weight (x) of 50 to 150 g/m$^2$, said nonwoven fabric consisting essentially of a multiplicity of substantially continuous, individual, polyurethane filaments disposed in randomly overlapping relationship to each other and bonded to each other at the points where they cross each other, said filaments having an average diameter of 30 microns or less, said nonwoven fabric having an elongation at break of 300 to 800%, a breaking strength of from 1.4 to 1.2 kg/cm, an elastic recovery percentage of at least 85% from 100% elongation and at least 90% from 50% elongation, an air permeability of at least 10 cc/cm$^2$/sec. and a bending resistance (y) in the range of 20 to 50 mm, wherein $y < 0.2x + 30$, said two sheets being heat sealed together along the periphery thereof to form a configuration corresponding to the contour of a hand, leaving the wrist portion unsealed.

* * * * *